US012605674B2

(12) United States Patent
Shmidt et al.

(10) Patent No.: US 12,605,674 B2
(45) Date of Patent: Apr. 21, 2026

(54) LIQUID PURIFICATION SYSTEM

(71) Applicant: Electrophor Inc., Woodmere, NY (US)

(72) Inventors: Joseph Lvovich Shmidt, New York, NY (US); Yurij Vladimirovich Tatuev, St. Petersburg (RU)

(73) Assignee: Electrophor Inc., Woodmere, NY (US)

( * ) Notice: Subject to any disclaimer, the term of this patent is extended or adjusted under 35 U.S.C. 154(b) by 225 days.

(21) Appl. No.: 15/540,785

(22) PCT Filed: Dec. 16, 2015

(86) PCT No.: PCT/RU2015/000890
§ 371 (c)(1),
(2) Date: Jun. 29, 2017

(87) PCT Pub. No.: WO2016/108733
PCT Pub. Date: Jul. 7, 2016

(65) Prior Publication Data
US 2018/0008934 A1 Jan. 11, 2018

(30) Foreign Application Priority Data

Dec. 30, 2014 (RU) ........................... RU2014154348

(51) Int. Cl.
B01D 61/08 (2006.01)
B01D 61/02 (2006.01)
(Continued)

(52) U.S. Cl.
CPC ........... B01D 61/08 (2013.01); B01D 61/025 (2013.01); B01D 61/027 (2013.01); B01D 61/04 (2013.01);
(Continued)

(58) Field of Classification Search
None
See application file for complete search history.

(56) References Cited

U.S. PATENT DOCUMENTS

| 2,910,836 A | 11/1959 | Karrer |
| 3,493,496 A | 2/1970 | Bray |
(Continued)

FOREIGN PATENT DOCUMENTS

| CN | 101732901 | 6/2010 |
| CN | 107108267 | 8/2017 |
(Continued)

OTHER PUBLICATIONS

International Search Report for PCT/RU2015/000890 mailed Apr. 21, 2016, 1 page.
(Continued)

*Primary Examiner* — Jonathan M Peo
(74) *Attorney, Agent, or Firm* — Fitch, Even, Tabin & Flannery LLP

(57) ABSTRACT

A liquid purification system includes a system raw liquid feed unit and a filtration unit, which includes a liquid concentration device having an internal partition dividing a variable volume collection cavity for raw liquid coming from an initial stage of liquid filtration and for mixing therein concentrate and a raw liquid displacement cavity. The cavity is connected to a secondary line that supplies raw liquid to the cavity to displace concentrate from the collection cavity and to recycle raw liquid from the displacement cavity through the secondary line under pressure exerted by concentrate and raw liquid in the collection cavity. A filtration unit provides long-term contact between raw liquid and concentrate in the variable-volume collection cavity to provide smooth increase in the concentration of liquid supplied to a liquid purification device.

5 Claims, 1 Drawing Sheet

(51) Int. Cl.
    *B01D 61/04*     (2006.01)
    *C02F 1/44*     (2023.01)
    *C02F 1/68*     (2023.01)

(52) U.S. Cl.
    CPC ............... *C02F 1/44* (2013.01); *C02F 1/441*
    (2013.01); *C02F 1/442* (2013.01); *C02F 1/685*
    (2013.01); *B01D 2311/04* (2013.01); *B01D*
    *2311/12* (2013.01); *B01D 2311/252* (2022.08);
    *C02F 2301/046* (2013.01); *C02F 2303/10*
    (2013.01); *C02F 2303/22* (2013.01); *Y02A*
    *20/131* (2018.01); *Y02W 10/30* (2015.05)

(56) References Cited

U.S. PATENT DOCUMENTS

| | | | |
|---|---|---|---|
| 3,794,172 A | 2/1974 | Bray | |
| 4,086,166 A | 4/1978 | Martin | |
| 4,176,063 A | 11/1979 | Tyler | |
| 4,243,523 A * | 1/1981 | Pelmulder | B01D 61/08 |
| | | | 210/652 |
| 4,626,346 A | 12/1986 | Hall | |
| 4,833,888 A | 5/1989 | Kerner | |
| 4,891,594 A | 1/1990 | Wilfley | |
| 4,973,404 A | 11/1990 | Weber | |
| 4,981,594 A * | 1/1991 | Jones | B01D 61/027 |
| | | | 210/195.2 |
| 4,983,301 A * | 1/1991 | Szucz | B01D 61/022 |
| | | | 210/321.66 |
| 4,997,553 A | 3/1991 | Clack | |
| 5,049,272 A | 9/1991 | Nieweg | |
| 5,266,203 A | 11/1993 | Mukhopadhyay | |
| 5,503,735 A | 4/1996 | Vinas | |
| 6,068,764 A | 5/2000 | Chau | |
| 6,093,312 A * | 7/2000 | Boulter | B67D 1/0009 |
| | | | 210/86 |
| 6,103,125 A | 8/2000 | Kuepper | |
| 6,162,361 A | 12/2000 | Adiga | |
| 6,190,558 B1 | 2/2001 | Robbins | |
| 6,290,856 B1 | 9/2001 | Beall | |
| 6,331,253 B1 | 12/2001 | Schrive | |
| 7,285,210 B2 | 10/2007 | Schmitt | |
| 7,338,595 B2 | 3/2008 | Vannewenhizen | |
| 7,601,256 B2 | 10/2009 | Beall | |
| 7,628,921 B2 | 12/2009 | Efraty | |
| 9,550,150 B2 | 1/2017 | Smirnov | |
| 10,954,141 B2 | 3/2021 | Wilson | |
| 2002/0100716 A1 | 8/2002 | Bosko | |
| 2005/0023198 A1 | 2/2005 | Halemba | |
| 2005/0109703 A1 | 5/2005 | Newenhizen | |
| 2007/0062870 A1 | 3/2007 | Chen | |
| 2007/0151925 A1 | 7/2007 | De Los Reyes | |
| 2009/0113898 A1 | 5/2009 | Kirol | |
| 2009/0152197 A1 | 6/2009 | Lilas et al. | |
| 2010/0018220 A1 | 1/2010 | Modad | |
| 2011/0180465 A1 | 7/2011 | Richetti | |
| 2011/0198275 A1 | 8/2011 | Hayes | |
| 2011/0303660 A1 | 12/2011 | Yang | |
| 2012/0048790 A1 | 3/2012 | Manfred | |
| 2012/0168368 A1 | 7/2012 | De Los Reyes | |
| 2012/0234739 A1 | 9/2012 | Smirnov | |
| 2013/0126430 A1 | 5/2013 | Kenley | |
| 2013/0334115 A1 | 12/2013 | Manfred | |
| 2014/0061129 A1 | 3/2014 | Hoz | |
| 2014/0110337 A1 | 4/2014 | Hoz | |
| 2022/0003218 A1 | 1/2022 | Hager | |

FOREIGN PATENT DOCUMENTS

| | | |
|---|---|---|
| CN | 107250063 | 10/2017 |
| CN | 108473341 | 8/2018 |
| CN | 108473342 | 8/2018 |
| DE | 102006015675 | 10/2007 |
| DE | 202011000680 | 9/2011 |
| DE | 16842406 | 11/2018 |
| DE | 16842407 | 11/2018 |
| EP | 0479492 | 4/1992 |
| EP | 1183212 | 3/2002 |
| EP | 3241807 | 11/2017 |
| EP | 3345871 | 7/2018 |
| EP | 3345872 | 7/2018 |
| FR | 2940764 | 7/2010 |
| RU | 2004233 | 12/1993 |
| RU | 2047330 | 11/1995 |
| RU | 2100295 C1 | 12/1997 |
| RU | 20256 | 10/2001 |
| RU | 22434 | 4/2002 |
| RU | 2199377 C1 | 2/2003 |
| RU | 2287490 | 11/2006 |
| RU | 2297389 | 4/2007 |
| RU | 2363663 | 9/2007 |
| RU | 2006105261 | 9/2007 |
| RU | 2331586 | 11/2007 |
| RU | 2006121054 A | 1/2008 |
| RU | 2323036 C2 | 4/2008 |
| RU | 2323766 | 5/2008 |
| RU | 74909 | 7/2008 |
| RU | 89097 | 11/2009 |
| RU | 2421270 | 4/2011 |
| RU | 2473472 | 1/2013 |
| RU | 2484884 | 6/2013 |
| RU | 2494971 | 10/2013 |
| RU | 2531392 | 10/2014 |
| RU | 2614705 | 3/2017 |
| RU | 2015137550 | 3/2017 |
| SU | 1764094 | 9/1992 |
| WO | 8502783 | 7/1985 |
| WO | 9947226 | 9/1999 |
| WO | WO 0076639 A1 * | 12/2000 | ............. B01D 61/06 |
| WO | 2002055182 | 7/2002 |
| WO | WO 02055182 A1 * | 7/2002 | ........... B01D 61/025 |
| WO | WO 2010122336 A2 * | 10/2010 | .......... B01D 61/022 |
| WO | 2011110585 | 9/2011 |
| WO | 2012112045 | 8/2012 |
| WO | 2015083717 | 6/2015 |
| WO | 2015121821 | 8/2015 |
| WO | 2016108733 | 7/2016 |
| WO | 2017039485 | 3/2017 |

OTHER PUBLICATIONS

International Search Report for PCT/RU2015/000522 mailed Dec. 24, 2015, 2 pages.
International Search Report for PCT/RU2016/000466 mailed Jan. 12, 2017; 1 page.
International Search Report for PCT/RU2016/000464 mailed Jan. 19, 2017; 1 page.
Supplemental European Search Report and Written Opinion for EP15875786 dated May 16, 2018; 7 pages.
International Search Report in corresponding International Application No. PCT/RU2015/000216, mailed Aug. 13, 2015, 3 pages.
International Report on Patentability in corresponding International Application No. PCT/RU2015/000216, mailed Jul. 8, 2015, 6 pages.
Supplemental European Search Report for EP15807541 mailed Feb. 15, 2018; 2 pages.
Supplemental European Search Report for EP3214046 dated May 16, 2018; 2 pages.
Written Opinion of the International Searching Authority for EP15807541 mailed Feb. 15, 2018; 5 pages.
Written Opinion of the International Searching Authority for EP3214046 dated May 16, 2018; 5 pages.
Written Opinion of the International Searching Authority for PCT/RU2015/000216 mailed Aug. 13, 2015; 6 pages.
International Report on Patentability in corresponding International Application No. PCT/RU2015/000890 mailed Jul. 18, 2017; 6 pages.
International Extended Search Report in International Application No. PCT/RU2015/000890 mailed May 25, 2018; 6 pages.
Provisional Opinion and Partial Search Report for EP3345871, dated Apr. 16, 2019; 11 pages.

(56) References Cited

OTHER PUBLICATIONS

International Prelminary Report on Patentability and Written Opinion of the International Search Authority for PCT/RU2016/000466 issued Mar. 6, 2018; 5 pages.
European Search Opinion for EP3345872, dated Mar. 29, 2019; 4 pages.
WO2015121821; EPO Machine Translation (Year: 2020).
FR2940764A 1—EPO Machine Translation (Year: 2020).
International Search Report for PCT/RU2019/000309 dated Aug. 13, 2019; 2 pages.

* cited by examiner

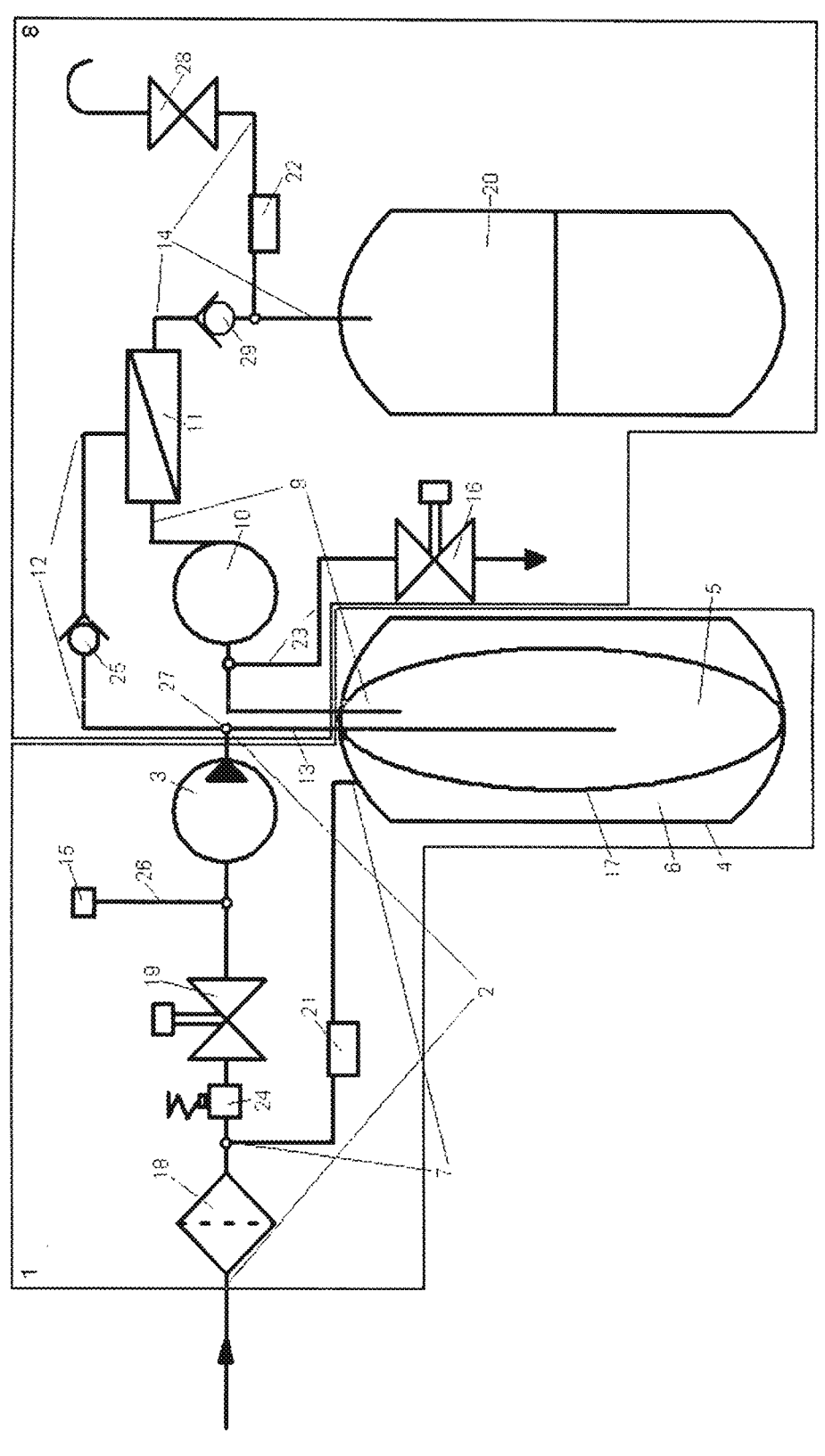

LIQUID PURIFICATION SYSTEM

CROSS-REFERENCE TO RELATED APPLICATIONS

This application is the National Stage of International Application No. PCT/RU2015/000890, filed Dec. 16, 2015, which claims the benefit of Russian Patent Application No. 2014154348 filed Dec. 30, 2014.

TECHNICAL FIELD

The invention relates to systems for purification and/or desalination of liquids, mostly water, used in domestic and/or drinking water supply in residential and/or industrial environment, summer cottages and garden plots.

BACKGROUND

A variety of liquid purification systems are known and widely spread.

A reverse osmosis liquid treatment system with controlled recycling (liquid purification system) is disclosed in International Application WO 2002/055182 A1 (B01D 61/00, publ. Jul. 18, 2002, applicant TEKNOWSMARTZ INNOVATIONS/-TECHNOLOGY INC., Canada). The water purification system comprises a system raw liquid feed unit including a primary raw liquid supply line with pressurizing means mounted therein, a secondary line with an inlet connected, via an adapter, to the primary raw liquid supply line; a liquid filtration unit arranged before the pressurizing means and including a line for mixing the concentrate formed in the filtration process with raw liquid, an inlet of the mixing line being connected, via a tee, to the primary raw liquid supply line, and an outlet being connected to liquid purification means; a concentrate recycling line having a liquid velocity increasing means mounted therein, an inlet of the concentrate recycling line being connected to a concentrate exit of the liquid purification means, and an outlet being connected, via a tee, to an outlet of the primary raw liquid supply line and an inlet of the line for mixing the concentrate formed in the filtration process with raw liquid; a line for supplying purified liquid into a purified liquid disinfection tank; a line for supplying the purified liquid from the disinfection tank with purified liquid pressurizing means mounted therein, connected to a high-pressure purified liquid collection cavity and, via an adapter, to a line for supplying the purified liquid to a consumer; a line for recycling the purified liquid back into the liquid filtration unit, an inlet of which is connected to the line for supplying purified liquid to a consumer, and outlet is connected to a concentrate recycling line before the liquid velocity increasing means. Furthermore, an auxiliary substance supply unit is connected to the concentrate recycling line. Operation of the entire system is controlled by a system of sensors and detectors, connected to a controller, to which a liquid disinfection device for disinfection of liquid present in the collection cavity for disinfection of the purified liquid, and solenoid valves mounted in the system liquid supply lines are connected.

The liquid purification system operates as follows. At start-up of the system raw liquid is supplied from a source to the primary raw liquid supply line, passes through a prefilter and pressurizing means, and through the line for mixing the concentrate formed in the filtration process with raw liquid comes into the liquid purification means. After the liquid purification means, the purified liquid flows to a collection cavity for disinfection of the purified liquid and further, via the purified liquid pressurizing means, comes to a high-pressure purified liquid collection container, or to a line for supplying the purified liquid to a consumer. Concentrate is supplied after the pressurizing means to the concentrate recycling line and further, through the liquid velocity increasing means, to the line for mixing the concentrate formed in the filtration process with raw liquid, and then to an inlet of the liquid purification means. In course of the liquid filtration process, additional raw liquid is continuously supplied into the system through the primary raw liquid supply line and mixes with the concentrate in the line for mixing the concentrate formed in the filtration process with raw liquid. During one liquid filtration cycle the mixture of concentrate and raw liquid passes through the liquid purification means several times. When the concentration of salts in the mixture reaches a predetermined level the liquid filtration process is stopped. The system goes into a purge mode. Fresh raw liquid flows from the source through the secondary line, an outlet of which is connected to the concentrate recycling line before the liquid velocity increasing means, passes through the liquid velocity increasing means and further, through the line for mixing the concentrate formed in the filtration process with raw liquid, comes to an inlet of the liquid purification means. After the liquid purification means the concentrate with increased salt content is discharged to drain. The purge mode lasts for a predetermined time necessary to completely remove contaminants from the liquid purification means. Furthermore, the liquid purification system provides for flushing the liquid purification means with purified liquid. It should be noted that the secondary line is connected to the system only at the step of flushing the liquid purification means.

Although the liquid purification system can efficiently purify raw liquid with a high content of contaminants due to flushing the liquid purification means with purified liquid, it has a number of disadvantages.

One of main disadvantages of the liquid purification system is the increased intake of raw liquid and consumption of purified liquid, which complicates the use of the liquid purification system in arid regions with shortage of drinking water. Furthermore, the system comprises two raw liquid pressurizing means and two liquid velocity increasing means. Operation of these devices requires a lot of energy. Also, as mentioned above, operation of the entire system is controlled by a system of sensors and detectors, which are connected to a controller sending control signals to the liquid disinfection device and solenoid valves mounted in the liquid feed lines. The system of connections must operate concisely and uninterruptedly because its disturbance can lead to malfunction of the liquid purification system.

Another liquid purification system is known from International Application WO 00/76639 A1, (B01 D 61/00, publ. Dec. 21, 2000, Norway). The liquid purification system comprises a system raw liquid feed unit including a primary raw liquid supply line, a secondary line, an inlet of which is connected, via an adapter, to the primary raw liquid supply line before pressurizing means mounted in the primary raw liquid supply line, and an outlet is connected through connecting lines to two containers, each comprising a collection cavity for the concentrate coming therein during filtration process, and a raw liquid displacement cavity; a filtration unit including a line for recycling of the raw liquid displaced by the concentrate formed in filtration process, with a liquid velocity increasing means mounted in the recycling line, an inlet of which is connected through connecting lines with two raw liquid displacement cavities of the containers, and an outlet is connected to the primary raw liquid supply line after the liquid velocity increasing means; a liquid purification means, an inlet of which is connected with outlet of the primary raw liquid supply line; a purified liquid supply line connected to an outlet of the liquid purification means; a concentrate line, an inlet of which is connected to a concentrate exit of the liquid purification means, and an outlet is connected to a two-way valve providing variable periodic supply of concentrate through connecting lines into the concentrate collection cavity from the containers, and two drain discharge valves.

The liquid purification system operates as follows. Raw liquid from a source comes to the primary raw liquid supply line and flows, via pressurizing means, to inlet of the liquid purification means. Then, purified liquid after the liquid purification means comes to an inlet of the purified liquid supply line, and the concentrate passes, through the two-way valve, into the concentrate collection cavity of one of the containers. The process of the concentrate coming into the concentrate collection cavity of one of the containers proceeds until a predetermined level of concentrate is attained in the concentrate collection cavity. Upon reaching the predetermined concentrate level the filled concentrate collection cavity is disconnected from the liquid purification means, and the concentrate collection cavity of the second container is connected. At the instant of disconnection of the collection cavity for concentrate formed in filtration process of the first container from the liquid purification means, pressure in the cavity dramatically drops. Raw liquid under the pressure present in the source and exceeding the pressure in the concentrate collection cavity disconnected from the pressurizing means flows into the raw liquid displacement cavity of the first container via the secondary line; when this occurs, the concentrate is displaced from the collection cavity to drain. After all concentrate has been displaced from the collection cavity to drain, the displacement cavity is fully filled with raw liquid. At re-filling the concentrate collection cavity of the first container with concentrate, raw liquid will be displaced by concentrate and supplied, via the raw liquid recycling, to the primary raw liquid supply line for further purification. Upon filling the concentrate collection cavity of the second container with concentrate, the above process is repeated. Thus, in course of liquid purification the containers are alternately connected to the liquid purification means and filled with concentrate and raw liquid.

In operation of the liquid purification system energy is consumed only to raise the pressure sufficiently not only to overcome the resistance of the membrane, but also to provide operation of the whole system.

The liquid purification system has a number of drawbacks, the main of which is the lack of a concentrate recycling line, which is connected to an inlet of the liquid purification means for repeated passage of concentrate through the liquid purification means to obtain a certain amount of purified liquid. The system according to International Application WO 00/76639 A1 provides for only collecting the concentrate in the concentrate collection cavity of one of the containers and discharging it to drain. As the liquid purification system is an industrial plant, the amount of discharged concentrate is quite high, which leads to inefficient use of raw liquid. Furthermore, a lot of energy is to be consumed to ensure operation of the pressurizing means. In addition, in the case of failure of the two-way valve one of the containers can be flooded with concentrate.

A liquid purification system is disclosed in Application US 2009/0152197 A1 (B01D 61/02, publ. Jul. 18, 2009, Greece). The liquid purification system comprises a system raw liquid feed unit including a primary raw liquid supply line, a secondary line, an inlet of which is connected, via an adapter, to the primary raw liquid supply line before pressurizing means mounted in the primary raw liquid supply line; raw liquid intake means mounted in the primary raw liquid supply line before the pressurizing means; a liquid filtration unit including a line for mixing the concentrate formed in the liquid filtration process with raw liquid, an outlet of which is connected to an inlet of the liquid purification means; a concentrate exit of the liquid purification means connected to an inlet of a concentrate recycling line with at least two high pressure flow-through vessels mounted thereon; an outlet of the concentrate recycling line is connected through liquid velocity increasing means, via a tee, to an inlet of the line for mixing the concentrate with raw liquid and to an outlet of the primary raw liquid supply line; liquid flow control valves; pressure stabilizers; a purified liquid supply line connected to a purified liquid exit of the purification means; a drain discharge line, to which at least two high pressure through-flow vessels are connected via connecting lines. The secondary line of the system raw liquid feed unit is connected, through connecting lines, to the at least two high pressure flow-through vessels. The liquid purification system operates as follows. At start-up of the system raw liquid from a source flows through the primary raw liquid supply line, via the pressurizing means, to the line for mixing the concentrate formed in the filtration process with raw liquid, and further to the liquid purification means. Purified liquid from the liquid purification means comes to the purified liquid supply line. Concentrate coming under high pressure from the liquid purification means flows alternately through one of the two high pressure flow-through vessels and further, via the concentrate recycling line, comes to an inlet of the line for mixing the concentrate formed in the filtration process with raw liquid. In the filtration process raw liquid is continuously pumped into the system through the primary raw liquid supply line and mixes with concentrate in the line for mixing the concentrate formed in the filtration process with raw liquid. During one liquid filtration cycle the mixture of concentrate and raw liquid flows through one of the vessels and the liquid purification means several times. At the instant when the concentration of salts in the mixture reaches a predetermined level, one of the two flow-through vessels is disconnected from the liquid purification process, and the second vessel is connected. To flush one of the vessels, which is disconnected from filtration process, raw liquid is supplied through the secondary line to an inlet of the vessel, and being mixed with the concentrate passes through the vessel and exits to drain. During flushing the mixture of concentrate and raw liquid, passing through the second vessel, is concentrated. At the instant of completion of flushing the first vessel is again connected to the filtration process, while the second vessel is disconnected to perform flushing.

A disadvantage of the liquid purification system is that raw liquid is excessively consumed for flushing the high pressure flow-through vessels. Furthermore, like the system taught in International Application WO 2002/055182 A1, the mixing of the concentrate formed in liquid filtration process with raw liquid occurs only in the line for mixing the concentrate formed in the filtration process with raw liquid, which makes the resulting mixture of two liquids supplied to the membrane non-uniform. Such connection may reduce the operation efficiency of the membrane.

A liquid purification system with closed circuit (liquid purification system), chosen as the most relevant prior art, is disclosed in U.S. Pat. No. 7,628,921, publ. Dec. 8, 2009 (C02F/44, Avi Efraty, Israel). The liquid purification system comprises a system raw liquid feed unit comprising a container, a primary raw liquid supply line, a secondary line with a valve mounted thereon, connected via an adapter to the primary raw liquid supply line before pressurizing means mounted in the primary raw liquid supply line; a filtration unit including a line for mixing the concentrate formed in the filtration process with raw liquid, an inlet of which is connected via an adapter to the primary raw liquid supply line and an outlet in connected to an inlet of at least one liquid purification means; a concentrate recycling line for recycling the concentrate back to the container with liquid velocity increasing means mounted thereon, an inlet of which is connected to a concentrate exit of the liquid purification means, and an outlet is connected to an inlet of the line for mixing the concentrate formed in the filtration process with raw liquid; a connecting line between the line for mixing the concentrate formed in the filtration process with raw liquid, and the concentrate recycling line (of connecting line); a valve mounted in the connecting line; a drain discharge line with a valve mounted thereon before drain liquid velocity increasing means, an inlet of which is connected to the line for recycling the concentrate back to the container. Outlet of the secondary line is connected to the line for recycling the concentrate to the container. Two valves are mounted in the concentrate recycling line: one before the means for increasing the liquid velocity before the container and the other after the container.

The liquid purification system operates as follows. At the initial instant raw liquid is supplied to the primary raw liquid supply line from a source to fill the system with raw liquid under atmospheric pressure. As this takes place, the valve in the connecting line and the valve in the concentrate recycling line, mounted before the container, are opened. Then, the system is pressurized. Process of liquid purification begins. The valve mounted in the connecting line closes. The liquid to be purified (raw liquid at the initial time, and then the mixture of concentrate and raw liquid) flows sequentially in a closed circuit through at least one liquid purification means and the container, forming a large filtration circuit. In this process, raw liquid is continuously pumped into the system through the primary raw liquid supply line and mixes with concentrate in the concentrate mixing line, and purified liquid is continuously removed from the system. After a certain period of time the valves mounted in the line for recycling the concentrate formed in the filtration process back to the container are closed, and the container is disconnected from the liquid purification means. The valve in the connecting line opens and a small liquid filtration circuit is formed. At the same time, the valve in the secondary line and the valve in the drain line are opened. Raw liquid starts coming through the secondary line to the container and mixing with the concentrate. The resulting mixture flows to the drain discharge line and is removed from the system. The container is flushed with raw liquid until all the contaminated liquid is removed from it. All the described steps of the filtration process are periodically repeated.

The liquid purification system according to U.S. Pat. No. 7,628,921 enables continuous liquid filtration process with simultaneous cleaning of the system. However, the transition between stages of the filtration process is provided by operation of the valves mounted in the lines in the system. If at least one of them fails, malfunction and breakdown of the system will occur. Furthermore, removal of concentrate to drain occurs owing to supply of raw liquid to the container while it is mixing with concentrate. For this reason, an excessive amount of raw liquid should be fed to the container to completely replace the entire volume of the resulting mixture. This method of flushing the system increases the consumption of raw liquid.

SUMMARY

The object of the invention and the technical result attained in its use is to provide a new ergonomic liquid purification system, to simultaneously reduce the amount of energy and raw liquid supplied to the liquid purification system at effective use of these resources for liquid purification.

The object of the invention and the required technical result are achieved in a liquid purification system comprising a system raw liquid feed unit including a container, a primary raw liquid supply line and a secondary line, an inlet of which is connected via a connection element to the primary raw liquid supply line before pressurizing means mounted in the primary raw liquid supply line, and an outlet of the secondary raw liquid supply line is connected to the container; a filtration unit including a line for mixing the concentrate formed at the end of each liquid filtration cycle with raw liquid, the mixing line being connected via a connection element to the primary raw liquid supply line after the pressurizing means; at least one liquid purification means connected with liquid velocity increasing means; a line for recycling the concentrate to the device, connected to a concentrate exit of the at least one liquid purification means; a drain discharge line with a drain discharge valve mounted thereon; a purified liquid supply line connected to a purified liquid exit of the at least one liquid purification means, said system being made such that the system raw liquid feed unit is adapted to displace the concentrate from a container made as a liquid concentration device comprising an internal partition by the pressure exerted by raw liquid on the internal partition, said internal partition dividing the inner space of the liquid concentration device into a variable volume collection cavity for raw liquid coming at the initial stage of liquid filtration and for mixing therein the concentrate and raw liquid in course of the liquid filtration process, connected to the line for mixing the concentrate and raw liquid, which is connected via a connection element with the primary raw liquid supply line after the pressurizing means and with the line for recycling the concentrate into the liquid concentration device, and a raw liquid displacement cavity connected with the secondary line for supplying raw liquid to this cavity and intended to displace the concentrate from the collection cavity of the liquid concentration device by the raw liquid coming from the secondary line under the pressure exerted by raw liquid on the partition in drain liquid discharge process and to recycle the raw liquid from the displacement cavity of the liquid concentration device through the same line under the pressure exerted by the mixture of concentrate and raw liquid present in the collection cavity of the liquid concentration device on the internal partition of the liquid concentration device; and the filtration unit is adapted to provide long-term contact between raw liquid and concentrate in the variable volume collection cavity for raw liquid coming at the initial stage of liquid filtration and for mixing therein concentrate and raw liquid in the liquid filtration process, to provide smooth increase in the concentration of liquid supplied to the at least one liquid purification means owing to mixing the raw liquid with the concentrate in the collection cavity of the liquid concentration device, wherein an inlet of the at least one liquid purification means is connected through a line for supplying the mixture of concentrate and raw liquid, in which a liquid velocity increasing means is mounted, directly to the collection cavity of the liquid concentration device; and the line for recycling concentrate from the at least one liquid purification means to the liquid concentration device is connected via a connection element to the line for mixing the concentrate and raw liquid and to the primary raw liquid supply line; wherein the drain discharge valve can be mounted in any point of the filtration unit; wherein the liquid purification system further comprises an antiscalant and/or auxiliary substances dosed supply unit for supplying and uniformly mixing an antiscalant and/or auxiliary substances in the variable volume collection cavity with raw liquid coming into the variable volume collection cavity at the initial stage of liquid filtration, comprising an antiscalant and/or auxiliary substances storage tank connected to an inlet of an antiscalant and/or auxiliary substances supply line before antiscalant and/or auxiliary substances dosing means mounted in the antiscalant and/or auxiliary substances supply line; and an outlet of the antiscalant and/or auxiliary substances supply line is connected to the primary raw liquid supply line before the pressurizing means; wherein a prefilter is further mounted in the primary raw liquid supply line before the pressurizing means; wherein the pressurizing means mounted in the primary raw liquid supply line is intended to create pressure providing low-output operation of the system.

BRIEF DESCRIPTION OF THE DRAWINGS

FIG. 1 shows a schematic diagram of a liquid purification system.

DETAILED DESCRIPTION

A liquid purification system (FIG. 1) comprises a system raw liquid feed unit (1) and a liquid filtration unit (8).

The system raw liquid feed unit (1) includes a primary raw liquid supply line (2), a liquid concentration device (4), a pressurizing means (3), a secondary raw liquid supply line (7), an antiscalant dosed supply unit (15), a prefilter (18), a solenoid valve (19), a low pressure relay (21).

The primary raw liquid supply line (2) comprises mounted in series a pressure reducer (24), a solenoid valve (19) and pressurizing means (3), and additionally a prefilter (18).

The prefilter (18) can be, for example, a mechanical liquid purification filter element or an element containing activated carbon.

The pressurizing means (3) can be, for example, but not limited to, a membrane (diaphragm) pump designed to create pressure that provides low-output operation of the system.

The liquid concentration device (4) comprises, for example, but not limited to, a housing (not shown in FIG. 1) which is divided by an internal partition (17) into a variable volume collection cavity (5) for raw liquid coming at initial stage of liquid filtration and for mixing therein the concentrate and raw liquid in the liquid filtration process, and a raw liquid displacement cavity (6).

FIG. 1 shows an embodiment where an internal partition (17) is formed as a chamber defining a collection cavity (5) accommodated in the liquid concentration device (4). Space defined between inner walls of the housing (not shown in FIG. 1) and outer surface of the internal partition (17) of the chamber defining the collection cavity (5) forms a raw liquid displacement cavity (6).

In another embodiment each cavity in the liquid concentration device can be defined on three sides by inner walls of the housing and on one side by the internal partition (not shown in FIG. 1).

Structure of the liquid concentration device further allows e.g. the arrangement of the raw liquid displacement cavity inside a chamber defined by walls of the internal partition, and the collection cavity between inner walls of the housing and the outer surface of the chamber defining the displacement cavity (not shown in FIG. 1).

An inlet of the secondary raw liquid supply line (7) with a low pressure relay (21) mounted thereon is connected, via a tee (not shown in FIG. 1), to the primary raw liquid supply line (2), and an outlet is connected to the raw liquid displacement cavity (6) of the liquid concentration device (4).

Further connected to the primary raw liquid supply line (2) is an antiscalant and/or auxiliary substances dosed supply unit (15) comprising an antiscalant and/or auxiliary substances storage tank (not shown in FIG. 1) connected to an inlet of the antiscalant and/or auxiliary substances supply line (26) before means for dosing antiscalant and/or auxiliary substances such as a metering pump (not shown in FIG. 1) mounted in the antiscalant and/or auxiliary substances supply line (26); an outlet of the antiscalant and/or auxiliary substances supply line (26) is connected to the primary raw liquid supply line (2) before the pressurizing means (3). Auxiliary substances can be e.g. coagulants, oxidants, and catalysts.

The liquid filtration unit comprises a concentrate and raw liquid mixture supply line (9), liquid velocity increasing means (10), at least one liquid purification means (11), a concentrate recycling line (12), a line (13) for mixing the concentrate with raw liquid, a drain discharge line (23), a purified liquid supply line (14), and a purified liquid storage tank (20).

A liquid velocity increasing means (10), e.g. a centrifugal pump, is mounted in the concentrate and raw liquid mixture supply line (9).

An inlet of the concentrate and raw liquid mixture supply line (9) is connected to the collection cavity (5), an outlet of the concentrate and raw liquid mixture supply line (9) is connected to at least one liquid purification means (11). A purified liquid exit of the at least one liquid purification means (11) is connected to an inlet of a purified liquid supply line (14) with a check valve (29) mounted thereon, which is connected to means (28) for supplying purified liquid to a consumer and to a purified liquid storage tank (20), which can be, for example, but not limited to, a water-air tank, a non-pressure tank or a liquid storage cavity provided with a compressor.

A concentrate exit of at least one liquid purification means (11) is connected to an inlet of the concentrate recycling line (12), an outlet of which is connected, via a connection element such as a tee (27), to an outlet of the primary raw liquid supply line (2) and an inlet of the concentrate and raw liquid mixing line (13). An outlet of the concentrate and raw liquid mixing line (13) is connected to a collection cavity (5) of the liquid concentration device (4). A check valve (25) is mounted in the concentrate recycling line (12) to pass the concentrate only towards the collection cavity (5).

The liquid purification means (11) comprises, for example, but not limited to, a membrane element (reverse osmosis or nano-filtration membrane in a casing) or a cascade of membrane elements.

An outlet of the secondary line (7) is connected to the raw liquid displacement cavity (6) of the liquid concentration device (4).

The drain discharge line (23) with a solenoid valve (16) mounted thereon can be connected to the concentrate and raw liquid mixture supply line (9) before the liquid velocity increasing means (10) (FIG. 1), after the liquid velocity increasing means (10) (not shown in FIG. 1). Otherwise, the drain discharge line (23) with a solenoid valve (16) mounted thereon can be connected to the concentrate recycling line (12). In the latter case such connection of the drain discharge line (23) will allow flushing of the liquid purification means (11) with raw liquid (not shown in FIG. 1).

Within the scope of distinctive features, the liquid purification system is intended to implement the following liquid filtration process.

At start-up of the liquid purification system raw liquid flows from a source to the inlet of the primary raw liquid supply line (2) and further, via the prefilter (18), to the pressurizing means (3). When raw liquid passes through the primary raw liquid supply line (2) a predetermined amount of antiscalant and/or auxiliary substances is fed to it from the antiscalant and/or auxiliary substances supply unit (15). The pre-purified raw liquid comprising an antiscalant is supplied through the concentrate and raw liquid mixing line (13) into the collection cavity (5) of the liquid concentration device (4). Owing to the fact that the pressurizing means (3) is disposed before the liquid concentration device (4), raw liquid enters the collection cavity (5) under a pressure that is kept constant during the liquid filtration cycle and is sufficient for passing the liquid through the at least one liquid purification means (11). As mentioned above, the liquid velocity increasing means (10) is mounted in the concentrate and raw liquid mixture supply line (9). Flow of raw liquid coming through the concentrate and raw liquid mixture supply line (9) from the collection cavity (5) passes through the liquid velocity increasing means (10) and acquires a velocity, at which the time of passage of the liquid through the liquid purification means (11) will be minimal. This is necessary to reduce the amount of contaminants remaining in the liquid purification means, and thereby to extend the service life of the at least one liquid purification means (11). After the liquid purification means (11) the purified liquid flows through the purified liquid supply line (14) into the purified liquid storage tank (20) or directly to consumers.

After the liquid purification means (11) the concentrate formed in the filtration process passes, through the concentrate recycling line (12), to the line (13) for mixing the concentrate with raw liquid and further to the collection cavity (5). As mentioned earlier, an inlet of the line (13) for mixing concentrate and raw liquid is connected to an outlet of the primary raw liquid supply line (2).

After the first passage of raw liquid through the liquid purification system, a ternary mixture of concentrate and raw liquid, which comprises a predetermined amount of an antiscalant, is formed in the filtration unit (8). The ternary mixture is formed owing to the fact that the collection cavity (5) receives the concentrate from the liquid purification means (11) via the line (13) for mixing concentrate with raw liquid through the concentrate recycling line (12), and raw liquid from a source through the primary raw liquid supply line (2) during the filtration cycle. Antiscalant is fed to the primary raw liquid supply line (2) once at the beginning of each filtration cycle. During one filtration cycle the ternary mixture passes through the liquid concentration device (4) and the at least one liquid purification means (11) several times. In this process the salt content (concentration of mixture) in the ternary mixture increases. Liquid filtration process stops when a predetermined volume of purified liquid is obtained.

Then process of refreshing the system starts. The valve (19) mounted in the primary raw liquid supply line (2) shuts off the flow of raw liquid to the collection cavity (5); the pressurizing means (3) and the liquid velocity increasing means (10) are switched off. As a result, pressure on the concentrate and raw liquid mixing line (13) decreases. As pressure in the collection cavity (5) becomes lower than pressure in the raw liquid source, raw liquid starts flowing through the secondary line (7) to the displacement cavity (6) and gradually displaces the concentrated ternary mixture via the drain discharge line (23) through the open drain discharge valve (16) from the system.

In the embodiment where the drain discharge line (23) is disposed in the concentrate recycling line (12) (not shown in FIG. 1), liquid remaining in the line (9) for supplying the mixture of concentrate an raw liquid passes, under residual pressure, through the liquid purification means (11); in this case a small amount of purified liquid is formed, which increases the efficiency of the system. Also, before starting a new filtration cycle, the at least one liquid purification means (11) can be flushed with raw liquid. In this case, raw liquid coming into the collection cavity (5) passes through the at least one liquid purification means (11) and is removed from the system through the valve (16).

Upon completion of the system cleaning process, the valve (16) closes, the valve (19) opens and the pressurizing means (3) and the liquid velocity increasing means (10) are actuated. Liquid filtration cycle starts. As pressure in the collection cavity (5) increases with admission of liquid into it, raw liquid from the raw liquid displacement cavity (6) returns, via the secondary line (7), to the primary raw liquid supply line (2), and comes with the main raw liquid flow into the collection cavity (5) and further into the liquid purification means (11).

Unlike the most relevant prior art, the system raw liquid feed unit is adapted to displace concentrate from the liquid concentration device (4) comprising an internal partition (17) under the pressure exerted by raw liquid on outer wall of the chamber (internal partition (17) of the collection cavity (5)). In this case, raw liquid used to refresh the system is not mixed with concentrate and not discharged to drain, but is recycled back to the liquid purification system for filtration, thereby reducing the consumption of raw liquid used. In addition, unlike the prior art, pressure in the liquid purification system is kept constant during the filtration cycle.

The fact that the line (13) for mixing concentrate with raw liquid of the filtration unit is connected to the collection cavity (5) provides long-term mixing (contact) of raw liquid with concentrate and smooth increase in the load on at least one liquid purification means (11) with increasing concentration of salts in the mixture; therefore the service life of the at least one liquid purification means (11) can be extended.

In the most relevant prior art, at the instant when the system switches from the large closed liquid purification circuit to the small purification circuit, the concentration of contaminants coming to at least one purification means dramatically increases, which decreases the effectiveness of its operation. The increased concentration of contaminants coming to at least one purification means increases the load on the pressurizing means and the liquid velocity increasing means, therefore, the amount of energy needed to make them work increases as well.

As mentioned earlier, unlike the most relevant prior art, in the present invention pressure is kept constant during the entire filtration cycle and sufficient for passage of liquid through at least one liquid purification means (11). Such pressure is created by the pressurizing means (3) disposed, in contrast to the prior art, before the liquid concentration device (4). Operation of the pressurizing means (3) consumes a small amount of energy. Also in the filtration cycle the ternary mixture comes into the collection cavity (5) of the liquid concentration device (4), where the antiscalant-containing raw liquid is additionally mixed with concentrate; this provides uniformly increasing load on at least one liquid purification means (11) during each passage of the mixture through liquid purification means (11) and does not require increasing the pressure for passage of liquid through it. Therefore, in addition to reduced consumption of raw liquid, the liquid purification system reduces the energy consumed for its operation.

The present description discloses a preferred embodiment of the invention. It can be modified within the scope of the claims thereby providing its wide applicability.

The invention claimed is:

1. A liquid purification system comprising:
a system raw liquid feed unit comprising:
    a single container made as a liquid concentration device and configured to receive raw liquid and comprising an internal partition configured to divide an inner space of the liquid concentration device into a variable volume collection cavity and a raw liquid displacement cavity,
    a primary raw liquid supply line, and
    a secondary raw liquid supply line having an inlet connected via a first connection element to the primary raw liquid supply line before a pressurizing means mounted in the primary raw liquid supply line,
    wherein an outlet of the secondary raw liquid supply line is connected to the single container;
a filtration unit comprising:
    a mixing line configured to direct concentrate formed by a liquid filtration cycle to be mixed with the raw liquid and be stored in the variable volume collection cavity of the single container, the mixing line connected via a second connection element to the primary raw liquid supply line after the pressurizing means,
    at least one liquid purification means connected with a liquid velocity increasing means that is connected to draw from the variable volume collection cavity,
    a recycling line configured to recycle at least a portion of the concentrate to the single container, the recycling line connected at one end to a concentrate exit of the at least one liquid purification means and connected at an other end to the second connection element connected to the mixing line such that there is a pumpless connection to feed the concentrate between the concentrate exit of the at least one liquid purification means and the variable volume collection cavity of the single container,
    a drain discharge line with a drain discharge valve mounted thereon, a purified liquid supply line connected to a purified liquid exit of the at least one liquid purification means,
wherein the system raw liquid feed unit is adapted to displace the concentrate from the single container by pressure exerted by the raw liquid on the internal partition,
wherein the variable volume collection cavity is configured to receive the raw liquid from an initial stage of liquid filtration and to receive and mix therein the concentrate and the raw liquid during a liquid filtration process,
wherein the raw liquid displacement cavity is connected with the secondary raw liquid supply line and configured to displace the concentrate from the variable volume collection cavity of the liquid concentration device by the raw liquid coming from the secondary raw liquid supply line under the pressure exerted by the raw liquid on the internal partition in a drain liquid discharge process and to recycle the raw liquid from the raw liquid displacement cavity of the liquid concentration device through the secondary raw liquid supply line and the pressurizing means under pressure exerted by a mixture of the concentrate and the raw liquid in the variable volume collection cavity on the internal partition of the liquid concentration device,
wherein the filtration unit is adapted to provide contact between the raw liquid and the concentrate in the variable volume collection cavity for the raw liquid coming at the initial stage of liquid filtration and sufficient for mixing therein the concentrate and the raw liquid in the liquid filtration process,
wherein an inlet of the at least one liquid purification means is connected through a line configured to supply the mixture of the concentrate and the raw liquid, and in which the liquid velocity increasing means is mounted, directly to the variable volume collection cavity of the liquid concentration device.

2. A liquid purification system according to claim 1, wherein the drain discharge valve can be mounted in any point of the filtration unit.

3. A liquid purification system according to claim 1, further comprising an antiscalant and/or auxiliary substances dosed supply unit configured to supply and mix an antiscalant and/or auxiliary substances in the variable volume collection cavity with the raw liquid coming into the variable volume collection cavity at the initial stage of liquid filtration, comprising an antiscalant and/or auxiliary substances storage tank connected to an inlet of an antiscalant and/or auxiliary substances supply line before antiscalant and/or auxiliary substances dosing means mounted in the antiscalant and/or auxiliary substances supply line; and
    an outlet of the antiscalant and/or auxiliary substances supply line is connected to the primary raw liquid supply line before the pressurizing means.

4. A liquid purification system according to claim 1, further comprising a prefilter mounted in the primary raw liquid supply line before the pressurizing means.

5. A liquid purification system according to claim 1, wherein the pressurizing means mounted in the primary raw liquid supply line is configured to create pressure providing operation of the liquid purification system at both reduced raw liquid and energy consumption.

* * * * *